United States Patent [19]

McAulay

[11] Patent Number: 4,851,840

[45] Date of Patent: Jul. 25, 1989

[54] OPTICAL ANALOG TO DIGITAL CONVERTER

[75] Inventor: Alastair D. McAulay, Kettering, Ohio

[73] Assignee: Wright State University, Dayton, Ohio

[21] Appl. No.: 141,934

[22] Filed: Jan. 6, 1988

[51] Int. Cl.$^4$ ............................................. H03M 1/12
[52] U.S. Cl. .................................... 341/137; 341/13; 341/14
[58] Field of Search ............................ 341/13, 14, 137

[56] References Cited

U.S. PATENT DOCUMENTS 4,546,244 10/1985 Miller .................................... 250/211
4,549,788 10/1985 Chemla .
4,626,075 12/1986 Chemla ................................. 350/354

FOREIGN PATENT DOCUMENTS

WO/8601939 3/1986 World Int. Prop. O. .

OTHER PUBLICATIONS

Miller et al., "The Quantum Well Self-Electrooptic Effect Device: Optoelectronic Bistability and Oscillation and Self-Linearized Modulation, " *J. Quantum Electronics* vol. QE-21, No. 9, Sept. 1985.

Taylor et al., "A New Double Heterostructure Optoelectronic Switching Device Using Molecular Beam Epitaxy, " *J. Appl. Phys.* 59 (2) Jan. 15, 1986.

*Primary Examiner*—William M. Shoop Jr.
*Assistant Examiner*—Gary J. Romano
*Attorney, Agent, or Firm*—Killworth, Gottman, Hagan & Schaeff

[57] ABSTRACT

An analog to digital converter, adapted to convert an optical analog signal to an equivalent optical digital signal being one of x optically presented digital numbers defined by an n-bit digital word, where $X=2^n$. The optical analog signal is light having an intensity variable over a range from a minimum to a maximum value. The analog to digital converter comprises a linear array of comparator means, a linear array of logic means, and a linear array of decoding means. The linear array of comparator means is responsive to the light at a plurality of input positions, x, and produces binary threshold signals which respresent a one-dimensional spacial reference having a length of corresponding to the magnitude of the sensed intensity. The linear array of logic means is responsive to the binary threshold signals and produces an optical index signal which is a one-point spacial reference having a location, an index postion, corresponding to the length of the one-dimensional spacial reference. The linear array of decoding means is responsive to the optical index signal and projects the digital number corresponding to the sensed intensity as the optical digital signal in response to being illuminated by the optical index signal.

24 Claims, 5 Drawing Sheets

| OPI / ELI | O | L |
|---|---|---|
| 0 | OFF | ON |
| 1 | ON | ON |

FIG. 8

| OUTPUT / STATE | OPO | ELO |
|---|---|---|
| ON | L | 0 |
| OFF | O | 1 |

OPTICAL ANALOG TO DIGITAL CONVERTER

BACKGROUND OF THE INVENTION

The present invention relates to an analog to digital converter and, more particularly, to a converter and method of converting an optical analog signal to an optical digital signal.

Because of the increased use of optical sensors and optical fibers for the high-bandwidth, noise-immune transmission of signals, analog signals are more often being provided optically at increasingly faster data rates in excess of 3.0 GHz (3,000 MHz) for data words having a length exceeding 10 bits. High performance analog to digital (hereinafter "A/D") converters are required to convert this high-speed data on a real time basis, but such converters currently operate at rates no better than a few hundred MHz for digital words in the four-bit range and tens of MHz for digital words in the ten-bit range. Three problems arise as a result of the unavailability of an A/D converter that operates at such high speeds.

First, systems using high speed transducers, such as radar and sonar, require analog preprocessing equipment to interface the sensor and the digital equipment so that the data rate is reduced to the range of the A/D converter. This analog preprocessing equipment is expensive and more difficult to operate than digital processing equipment. Second, existing A/D converters will not provide a digital output at a rate sufficiently large to drive optical devices currently under development that operate at rates up to 30 GHz. Third, current A/D converters have a limited dynamic range which makes the converter susceptible to noise interference so that systems such as radar and sonar can be easily jammed.

The A/D converters currently under development use electronics or other technologies rather than optics to accomplish high speed A/D conversion. For example, electronic A/D converters, such as flash converters, have been used, but are limited in bit size because encoders are required to provide an interface between the comparator outputs and the digital output of the flash converter. The encoders increase in size, cost and delay as the number of bits is increased. Other technologies having similar problems include electro-optic waveguide A/D converters and liquid crystal A/D converters. Accordingly, there is a need for an A/D converter capable of operating at high data speeds for word lengths over ten bits and, more specifically, one that is capable of converting an optical analog signal directly to an optical digital signal.

SUMMARY OF THE INVENTION

The present invention meets these needs by providing an analog to digital converter, adapted to convert an optical analog signal to a proportionally equivalent optical digital signal being one of x optically presented digital numbers defined by an n-bit digital word, where x equals $2^n$. The optical analog signal is light having an intensity variable over a range from a minimum to a maximum value. The analog to digital converter comprises a linear array of comparator means, a linear array of logic means, and a linear array of decoding means.

The linear array of comparator means is responsive to the source of light at a plurality of input positions, x, equally spaced along an input path, for sensing the intensity of the light and comparing the sensed intensity to a predetermined threshold intensity varying linearly from the minimum value at the first input position to the maximum value at the x'th input position. The comparator means produces a binary threshold signal at each input position in response to the comparison. The binary threshold signal remains in a first state when the predetermined threshold intensity exceeds the sensed intensity and switches to the second state when the sensed intensity exceeds the predetermined threshold intensity. As a result, the number of comparator means producing binary threshold signals in the first state represents a one-dimensional spacial reference having a length corresponding to the magnitude of the sensed intensity.

The linear array of logic means is responsive to the binary threshold signals at a plurality of output positions, x, equally spaced along an output path and spacially aligned with the linear array of comparator means for sensing the state of the binary threshold signals. The logic means produce a binary optical output at each output position in response to sensing this state. One of the binary optical outputs, an optical index signal, is turned on at the output position corresponding to the first input position at which the binary threshold signal switches to the second state from the first state, an index position, and the remaining ones of the binary optical outputs are turned off. As a result, the index position is a one-point spacial reference having a location corresponding to the length of the one-dimensional spacial reference and the magnitude of sensed intensity.

The linear array of decoding means is responsive to the binary optical output at a plurality of readout positions, x, equally spaced along the readout path and spacially aligned with the linear array of logic means. The decoding means is optically coded with a digital number at each readout position along a word path aligned generally perpendicular to the readout path. The digital numbers increase serially for successive readout positions that portionally correspond to increasing values of the intensity ranging from the minimum value to the maximum value. The linear array of decoding means projects the digital number corresponding to the sensed intensity as the optical digital signal in response to being illuminated by the optical index signal. As a result, the index signal directly addresses and illuminates the decoding means that presents the digital number which corresponds to the magnitude of the sensed intensity represented by the location of the index position.

Accordingly, it is an object of the present invention to provide apparatus and method for converting an optical analog signal to a proportionally equivalent optical digital signal and to provide such an A/D converter and method for an A/D conversion capable of converting an optical analog signal to a large optical binary number at high speeds. Other objects and advantages of the invention will be apparent from the following description, the accompanying drawings, and the appended claims.

DETAILED DESCRIPTION OF THE INVENTION

Figure 1:
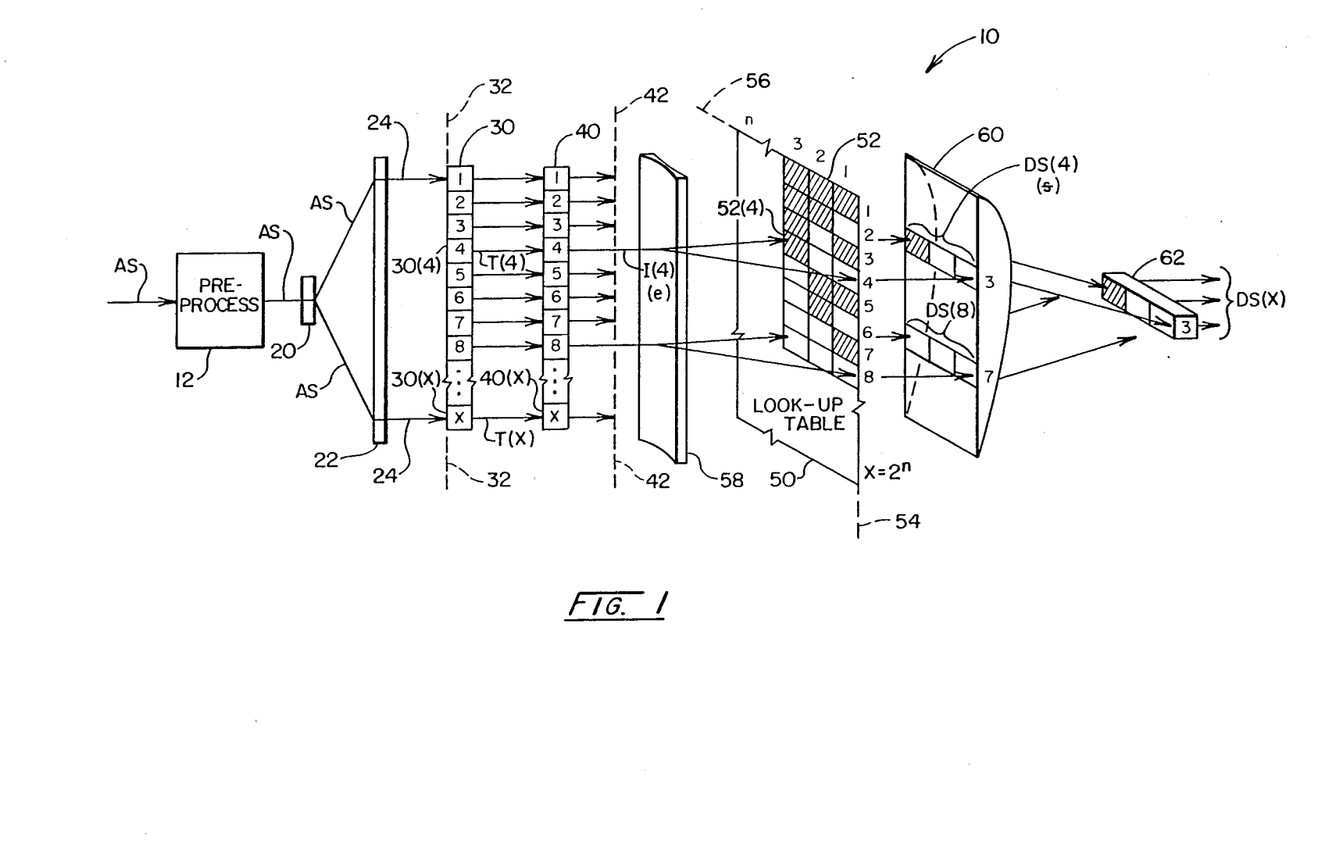
FIG. 1 is a partially schematic side view of an optical A/D converter comprising a linear array of comparator means and a linear array of logic means in accordance with the invention.

Referring to FIG. 1, an A/D converter indicated generally at 10 is adapted to convert an optical analog signal AS to a proportionally equivalent optical digital signal DS. The optical analog signal AS is provided by a source of light having an intensity that varies over a known range from a minimum to a maximum value. The light may be coherent, partially coherent or incoherent, however, coherent light is used in the preferred embodiment. The A/D converter senses the intensity of the analog signal AS and converts the sensed intensity to a proportionally equivalent digital signal DS. The digital signal DS is an optically presented digital number defined by an n-bit digital word comprising an output linear array of n light sources. The size of the digital word represents the intensity range of the analog signal AS so that an n-bit digital word provides x digital numbers over that intensity range, where $x = 2^n$. The size of the digital word should be large enough to obtain the desired resolution for the analog signal AS. The digital signal DS will be the digital number that corresponds to the magnitude of the sensed intensity.

For example, if the A/D converter is constructed to convert an analog signal to a 3-bit digital word as shown, it provides eight digital numbers over the intensity range of the analog signal AS. If the intensity of the analog signal AS ranges from 0 to 7 and the sensed intensity has a magnitude of 3, the digital signal DS is the digital number 011 represented by the output linear array as OLL (hereinafter "L" refers to light being on and "O" refers to light being off). If the sensed intensity has a magnitude of 7, the digital signal DS would be represented by the output linear array as LLL. These values will be used as an example throughout this description.

Transducers or sensors, such as antennae, (not shown) typically provide an analog signal that is used to modulate the output of a laser diode (not shown) to provide an analog signal in optical form. Some transducers, however, provide an analog signal that is already in optical form such as, for example, fiberoptic transducers. However provided, the optical analog signal AS may need to be processed at 12 depending on the quality of the signal provided by the input transducers. For example, the optical analog signal AS can be filtered to remove frequencies higher than the band width of the subsequent system including the A/D converter to avoid aliasing.

The A/D converter 10 comprises a collimator having lenses 20 and 22 for spreading and collimating the optical analog signal AS into a beam of light 24, a linear array 30 of comparator means 30(x) each providing a binary threshold signal T(x), a linear array 40 of logic means 40(x) each providing an optical index signal I(x), and a look-up table 50 responsive to an optical index signal I(x) to provide an optical digital signal DS. Hereinafter, the letter x represents a number ranging from 1 to $2^n$ where n represents the size of the digital word for the optical digital signal DS. The collimator is adjusted so that the beam of light 24 illuminates the linear array 30 of comparator means 30(x) and has a collimated width substantially equal to the length of the linear array 30. The linear array 30 comprises a column of comparator means 30(x), equally spaced at input positions (x) along an input path 32 of fixed length. The comparator means 30(x) are adjusted to predetermined threshold intensities TI(x) which vary linearly from the minimum value of the intensity for the comparator means 30(1) at input position (1) to the maximum value for the comparator means 30(x) at input position (x). Each comparator means 30(x) compares the sensed intensity of the analog signal AS to the predetermined threshold intensity TI(x) to produce the binary threshold signal T(x) which is in a first state when the predetermined threshold intensity TI(x) exceeds the sensed intensity and the second state when the sensed intensity exceeds the predetermined threshold intensity TI(x).

Figure 2:
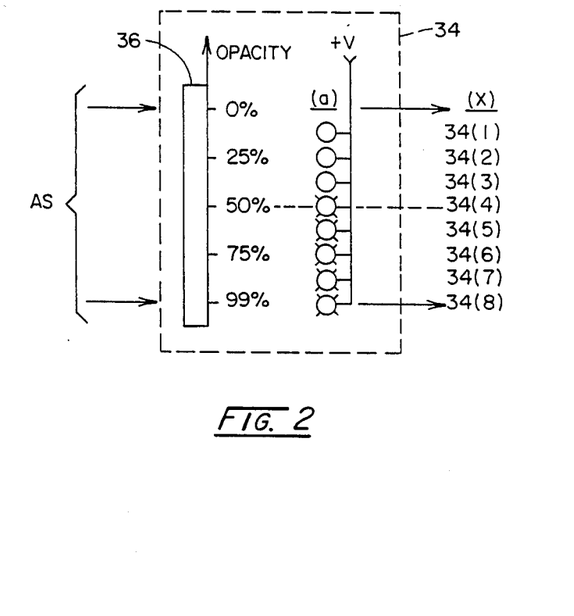
FIG. 2 is a schematic end view of a first embodiment of the linear array of the comparator means of FIG. 1.

Referring more specifically to FIG. 2, a first embodiment of the linear array 30 of comparator means 30(x) is shown at 34 and comprises a plurality of optical comparators 34(x) and a spacial linear filter 36 which variably transmits the magnitude of the sensed intensity of the optical analog signal AS to the linear array 34 of optical comparators 34(x). The filter 36 can be a piece of film having transmissivities ranging from substantially opaque at input position (8) to transparent at input position (1). Thus, each optical comparator 34(x) is "optically" adjusted to a predetermined threshold intensity TI(x) by a portion of the filter 36 while being electrically biased by a common voltage source V. Since the transmissivity of the filter 36 varies linearly, the predetermined threshold intensities TI(x) of the optical comparators 34(x) increase in equal increments from near zero, the minimum value of the intensity in this case, at input position (1) to the maximum value of the intensity to be sensed at input position (8). The optical comparator 34(1) is set at the minimum value to be sensed by adjusting the magnitude of the voltage source V. The maximum opaqueness of the film determines the maximum value to be sensed. The filter 36 may be varied from linear to correct for optical distortions.

Each comparator 34(x) compares the sensed intensity against the predetermined threshold intensity TI(x) to produce the binary threshold signal T(x) which is in the first state, O, when the sensed intensity exceeds the predetermined threshold intensity TI(x) and the second state, L, when the predetermined threshold intensity TI(x) exceeds the sensed intensity. In the example shown also in FIGS. 1 and 2, the sensed intensity of 3 does not exceed the predetermined threshold intensity TI(x) at input position (4) as indicated by the optical comparator 34(4) which, along with the higher order optical comparators 34(5) to 34(8), remain on while the lower order optical comparators 34(1)–34(3) switch off. The set of lower order optical comparators that switch-off represents a one-dimensional spacial reference having a length that corresponds to the magnitude of the sensed intensity. As the sensed intensity increases, more of the higher order comparators switch off.

Figure 3:
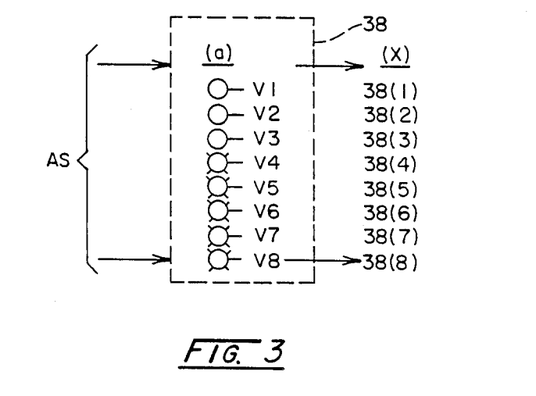
FIG. 3 is a schematic end view of a second embodiment of the linear array of comparator means of FIG. 1.

Referring to FIG. 3, a second embodiment of the linear array 30 of comparator means 30(x) is shown at 38 and comprises a plurality of optical comparators 38(x). Unlike the first embodiment of the optical comparators 34(x), the second embodiment of the optical comparators 38(x) are "electrically" adjusted to the predetermined threshold intensity TI(x) by separately biasing each comparator 38(x) with a voltage of different magnitude. Otherwise, the second linear array 38 operates in the same manner as does the first linear array 34. The optical comparators 34(x) and 38(x) can be either a SEED device or a DOES device. FIGS. 2 and 3 show the state of the binary threshold signal T(x) for the SEED device. The state of the binary threshold signal T(x) for the DOES device is the inverse of the SEED device so that the lower order comparators 34, 38(1)-34,38(3) switch on while the higher order comparators 34,38(4)-34,38(8) remain off. Thus, the set of lower order optical comparators that switch on represents a one-dimensional spacial reference having a length that corresponds to the magnitude of the sensed intensity. As the sensed intensity increases, more the the higher order comparators switch on. The SEED and DOES devices will be described below in more detail.

Referring back to FIG. 1, the linear array 40 comprises a column of x logic means 40(x) equally spaced at output positions (1 to x) along an output path 42 of fixed width. The linear array 40 of logic means 40(x) is spacially aligned with the linear array 30 so that the logic means 40(x) at each output position (x) is reponsive to the binary threshold signal T(x) from the comparator means 30(x) at the input position (1-x) corresponding numerically to the output position. The logic means 40(x) sense the state of the corresponding binary threshold signals T(x) and produce a binary optical signal at each output position (1-x) in response thereto. One of the binary optical output signals, an optical index signal I(x), is turned on at the output position (x) corresponding to the first input position at which the binary threshold signal T(x) is switched to the second state from the first state. The remaining ones of the binary optical output signals are turned off. The output position at which the optical index signal I(x) is produced is the index position which is a one-point spacial reference having a location corresponding to the length of the one-dimensional spacial reference and the magnitude of the sensed intensity. In the example being used, the index signal I(4) occurs at the index position where x=4 which corresponds to the input position (4) where the binary threshold signal T(4) switches to the second state from the first state, i.e., to L from 0 for the SEED device, and to 0 from L for the DOES device.

The look-up table 50 comprises a linear array 52 of decoding means comprising masks 52(x) equally spaced at readout positions (1 to x) along a readout path 54 of fixed length. The linear array 52 of masks 52(x) is spacially aligned with the linear array 40 so that the masks 52(x) at each readout position (1-x) is responsive to the optical output signals from the logic means 40(x) at the output position (1-x) corresponding numerically to the readout position. The masks 52(x) can be, for example, a piece of film comprising binary cells or bits 52(x,n) where n represents the size of the digital word for the optical digital signal DS. The binary cells are equally spaced at bit positions (1-n) along a word path 56 of fixed length that is generally perpendicular to the readout path 54. The bits 52(x,n) at numerically equal bit positions (1-n) are aligned in columns. Each bit 52 (x,n) is optically coded to be either transparent, L, or opaque, O, to form a mask 52(x) that presents a digital number defined by the n-bit digital word. The masks 52(x) are coded so that the digital numbers for the code used increase serially in equal increments for successive readout positions (1-x) along the readout path 54 and proportionally correspond to increasing values of the intensity range from the minimum to the maximum value. Referring to the example and FIG. 1, the mask 52(4) is coded with the digital number OLL, wherein bit 52(4,1) and bit 52(4,2) are transparent and bit 52(4,3) is opaque as indicated by the shading.

When the optical index signal I(x) illuminates the appropriate mask 52(x), the mask 52(x) presents the digital number that corresponds to the magnitude of the sensed intensity by virtue of the index position which is the one-point spacial reference having a position corresponding to the length of the one-dimensional spacial reference. Thus, referring again to the example and FIG. 1, the index signal I(4) illuminates the mask 52(4) that presents the optical digital signal DS(4) which represents the decimal number 3, the magnitude of the sensed intensity. It is to be understood that the look-up table 50 can be of any size to provide larger digital words and higher resolutions. It is also to be understood that the look-up table 50 can have different codings such as, for example, BCD or a Gray code. In some instances the Gray code may be preferred to obviate a problem arising when the intensity of the optical analog signal AS changes while being converted to an optical digital signal DS(x). It may happen that while switching from one index position to an adjacent index position, both devices will be activated for an instant because of variations in switching speeds. Normally, this is not a problem because of the high-speed switching of the optical A/D converter 10 with respect to the data rates associated with the optical analog signal AS. If it becomes a problem, the Gray code minimizes the effect of the one-position error because only one bit changes in the Gray code between any successive levels.

The A/D converter 10 further comprises a lens 58, disposed between the linear array 40 of logic means 40(x) and the look-up table 50, for diverging the optical index signal I(x) from any one of the output positions (1-x) to illuminate all of the cells or bits 52(x,n) of a mask 52(x) along the word path 56. The A/D converter 10 further comprises means, disposed to receive all of the optical digital signals DS(x), for focusing any one of the optical digital signals D(x) to a single location. Such means comprises a lens 60 which focuses any one of the optical digital signals DS(x) to a single n-bit optical sensor 62 at one location. For example, when the sensed intensity of the analog signal AS is 3, the optical digital signal DS(4) is focused on the optical sensor 62. Correspondingly, when the sensed intensity of the analog signal AS is 7, the optical digital signal DS(8) is also focused on the optical sensor 62. The example in which the sensed intensity of the optical analog signal AS is 3, causing the threshold signals T(1-3) to remain in the first state (i.e., off for the SEED device and on for the DOES device) and the index position to be at X=4, is applicable to the following description.

Figure 4:
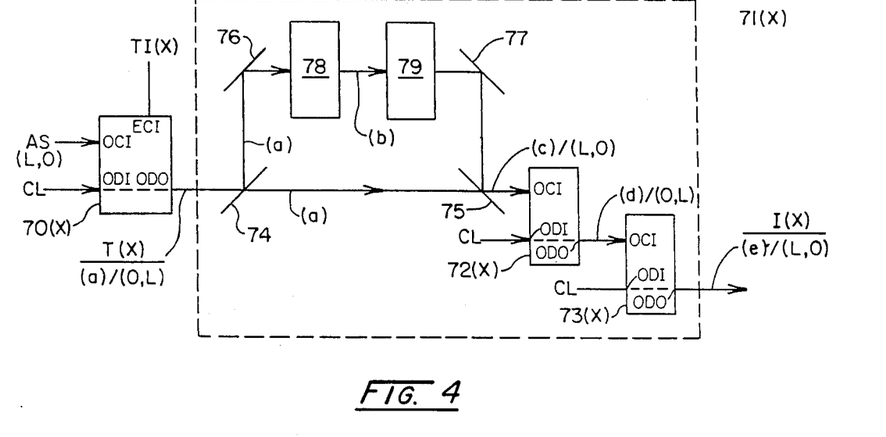
FIG. 4 is a schematic top view of a first embodiment of the comparator means and logic means of FIG. 1 constructed with SEED devices.
Figure 5:
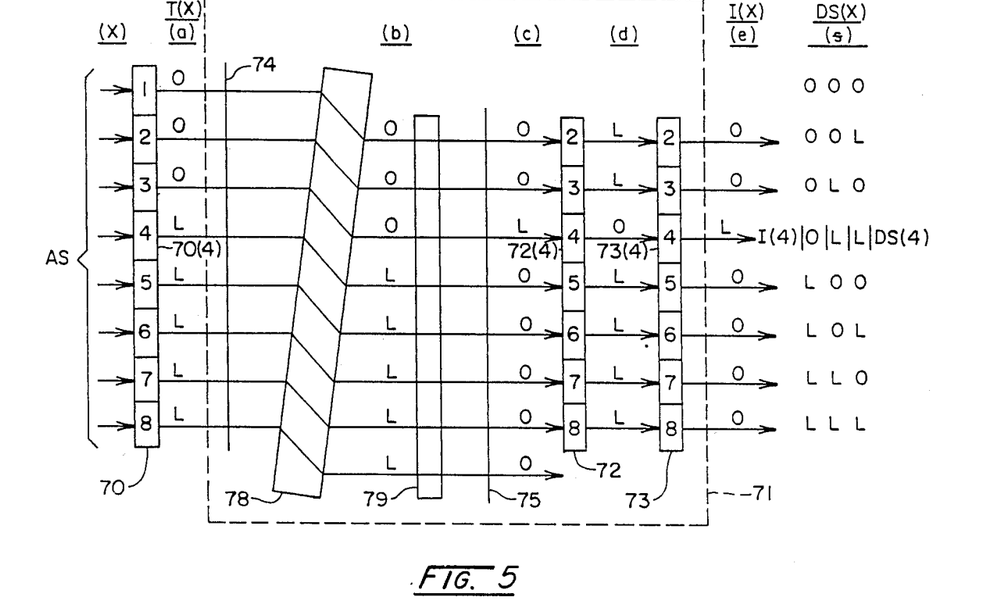
FIG. 5 is a schematic side view of a linear array of the comparator means and logic means of FIG. 4.

Referring now to FIGS. 4 and 5, a first embodiment of a linear array 34 or 38 of optical comparators 34(x) or 38(x) is shown at 70 and comprises (x) optical comparators 70(x). A first embodiment of a linear array 40 of logic means 40(x) is also shown at 71 and comprises (x) logic means 71(x). The optical comparator 70(x) comprises an opto-electronic device referred to as a SEED device, the structure and operation of which is shown, for example, in U.S. Pat. No. 4,546,244 granted to David A. B. Miller, the disclosure of which is hereby incorporated by reference. The SEED device 70(x) is shown in detail in FIG. 4 as having two optical inputs, an optical control input OCI and an optical data input ODI for receiving coherent light CL from a source of coherent light (not shown), and an optical data output ODO responsive to the optical control input OCI. Although coherent light is used in the preferred embodiment, the SEED device can also be operated with incoherent light. The SEED device also includes an electrical control input ECI for receiving a signal to properly bias the SEED device 70(x). When no light is applied to the optical control input OCI, the SEED device 70(x) transmits the coherent light CL from the optical data input ODI to the optical data output ODO; when light is applied to the optical control input OCI, the SEED device 70(x) blocks the transmission of the coherent light CL. This inverse logic is indicated by the parenthetical (L, O) at the optical control input OCI and the inverse parenthetical (O, L) at the optical data output ODO.

When the SEED device 70(x) is used as the optical comparator, the predetermined threshold intensity TI(x) is adjusted "optically" with the filter 36 as described above or "electrically" at the electrical control input ECI as described above. Furthermore, the optical data input ODI must be illuminated by coherent light so that the binary threshold signal T(x) at the optical data output ODO is also coherent light. The optical control input OCI is illuminated by the optical analog signal AS and controls the state of the binary threshold signal T(x) at the optical data output ODO as described above, i.e., the binary threshold signal T(x) turns off, O, when the sensed intensity exceeds the threshold intensity TI(x). In the example, the SEED device 70(4) remains on at input position 4 where the sensed intensity does not exceed the threshold intensity TI(4).

The linear array 71 of logic means 71(x) comprises a first linear array 72 of first SEED devices 72(x), each having an optical data input ODI for receiving coherent light CL from the source of coherent light, a second linear array 73 of second SEED devices 73(x), each having an optical data input ODI for receiving coherent light CL from the source of coherent light, two optical beam splitters 74 and 75, two optical reflectors 76 and 77, a lens 78 and an optical phase shifter 79. The logic means 71(x) can be operated using incoherent light to illuminate the optical data input ODI of the SEED devices 72(x) and 73(x). Otherwise, the SEED devices 72(x) and 73(x) operate in the same fashion as the SEED device 70(x) described above. As described in the previous paragraph, the optical comparators 70(x) provide the binary threshold signals T(x) by selectively transmitting the received coherent light CL in the second state, indicated by L, and blocking the received coherent light CL in the first state, indicated by O, in response to the comparison between the sensed intensity and the threshold intensity TI(x). The threshold signals T(x) are split into duplicate optical paths by the beam splitter 74 which transmits a reference path to the beam splitter 75 and reflects a modulation path to the lens 78 by means of the optical reflector 76. The light in the modulation path is transmitted through the lens 78 and the phase shifter 79 and then directed by the optical reflector 77 to the beam splitter 75 where it is recombined with the reference path at position (c). The lens 78 spatially shifts all of the binary threshold signals T(x) by one output position to provide a set of spatially shifted threshold signals at position (b) so that the signal at the index position, in the example x=4, changes state from on (L) at position (a) to off (O) at position (b).

The phase shifter 79 can be, for example, a thin piece of dielectric material commonly used to delay light transmitted therethrough by 180° or one-half of a wavelength of the light being transmitted. The phase shifter 79 shifts the phase of the spatially shifted threshold signals that are on (L) by a half of a wavelength, output positions (5) through (8) in the example, so that they destructively interfere at the position (c) with the original binary threshold signals T(x). As a result, the light at all of the higher order output positions below the index position, output positions (5) through (8) in the example, turn off (O) which leaves only one beam of light at the index position to be sensed by the optical control input OCI of the first SEED device 72 (x) located at the index position, first SEED device 72 (4) in the example. It should be noted that the least significant digital word DS(1) is lost because of the shifted signals. However, if the magnitude of the sensed intensity is low enough so that no digital signal is projected, a digital signal equal to zero is electronically provided at the output. Essentially, the lens 78, phase shifter 79, beam spliter 75 and the first SEED devices 72(x) function optically as an exclusive NOR operation. However, the linear array 72 of SEED devices 72(x) provides inverted signals relative to that desired or light at all of the output positions except the index position as shown at position (d), and indicated by the second SEED device 73(4) in the example. Therefore, the optical control inputs OCI for the second SEED devices 73(x) are responsive to the inverted outputs at the corresponding output positions and operate as an inverter to provide only one beam of light from the optical data output ODI of the second SEED device 72(x) located at the index position as the optical index signal I(x), indicated as I(4) in the example. The optical index signal I(4) illuminates the mask 52(4) as shown in FIG. 1 to provide the optical digital signal DS(4) optically presented as OLL which represents the decimal number 3, the magnitude of the sensed intensity of the analog signal AS.

Figure 6:
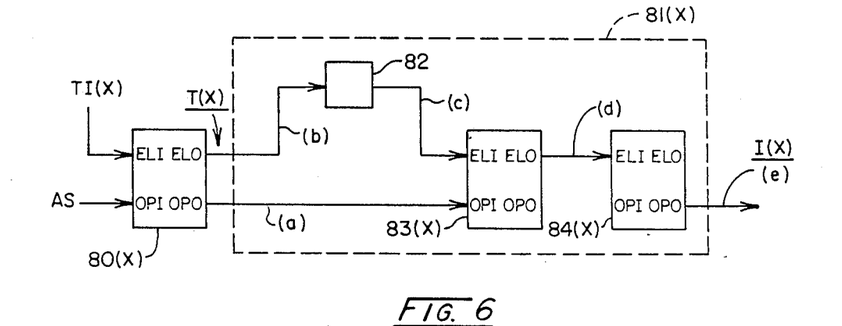
FIG. 6 is a schematic top view of a second embodiment of the comparator means and logic means of FIG. 1 constructed with DOES devices.
Figure 7:
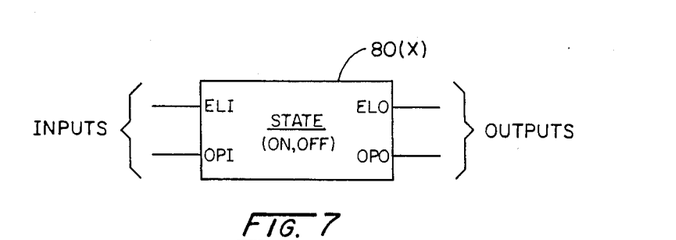
FIG. 7 is a schematic of a DOES device shown in FIG. 6.
Figure 8:
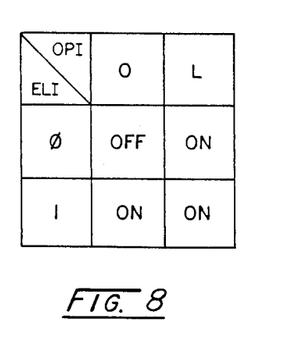
FIG. 8 is a table showing the state of the DOES device of FIG. 7 as a function of its input.
Figure 9:
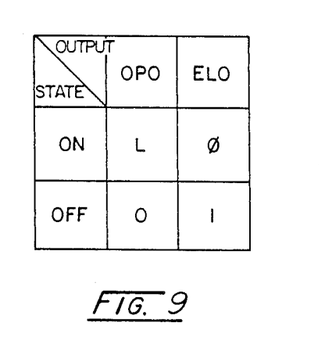
FIG. 9 is a table showing the output of the DOES device of FIG. 7 as a function of its state.
Figure 10:
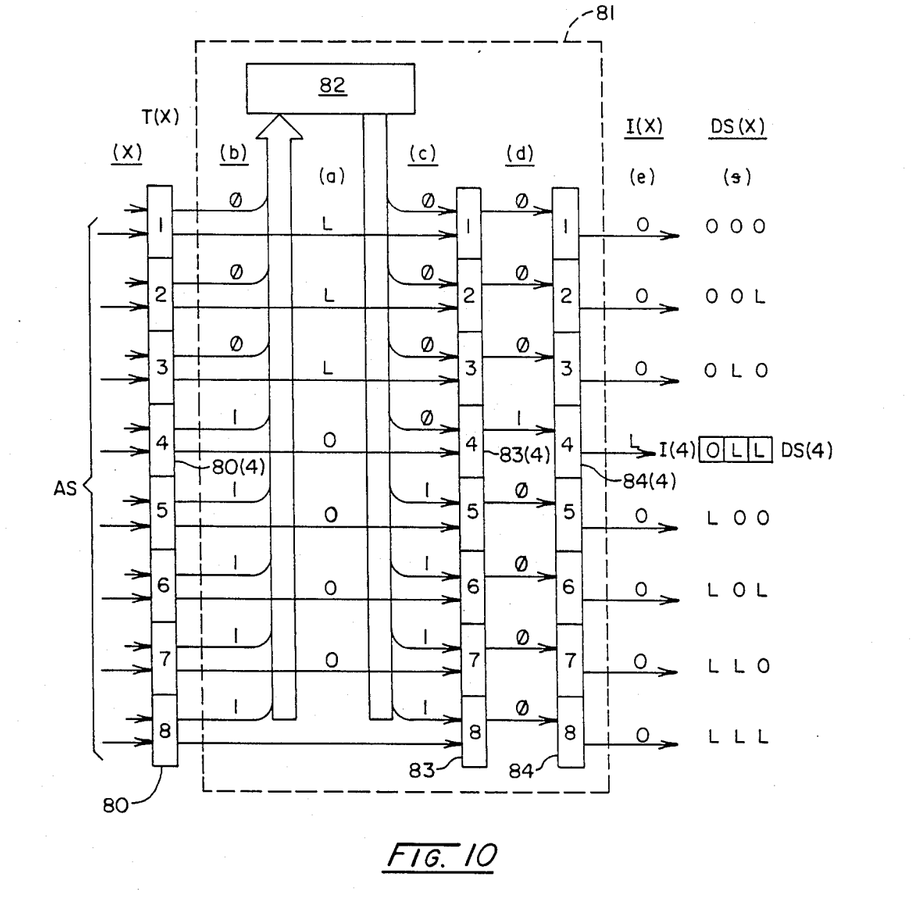
FIG. 10 is a schematic side view of a linear array of the comparator means and logic means of FIG. 6.

Referring now to FIGS. 6 and 10, a second embodiment of a linear array 34 or 38 of optical comparators 34(x) or 38(x) is shown at 80 and comprises x optical comparators 80(x). A second embodiment of a linear array 40 of logic means 40(x) is also shown at 81 and comprises x logic means 81(x). The optical comparator 80(x) is an electro-optic device referred to as a DOES device, the structure and operation of which is shown, for example, in an article entitled "A new hetero-structure optoelectronic switching device using molecular beam epitaxy" authored by G. W. Taylor et al and published in the Journal of Applied Physics, Vol. 59, No. 2, p. 596 on Jan. 15, 1986 and PCT Pat. No. 8,601,939 granted to J. G. Simmons and G. W. Taylor, the disclosures of which are hereby incorporated by reference. The DOES device is shown in detail in FIG. 7 as having two inputs, an electrical input ELI and an optical input OPI, which set the state of the device, and two outputs, an electrical output ELO and optical output OPO. Referring to FIG. 8, the state of the DOES device functions like an OR gate, the state of the device being ON when either or both of the inputs are switched on (ELI=1, OPO=L) and OFF when both of the inputs are switched off (ELI=o, OPO=O). Referring to FIG. 9, the optical output OPO is switched on to radiate light and the electrical output ELO drops to zero (OPO=L; ELO=0) when the state of DOES device is switched ON. When the state of the DOES device is switched OFF, the optical output OPO is switched off and the electrical output ELO is switched on (OPO=O, ELO=1).

When the DOES device is used as the optical comparator 80(x), the threshold intensity TI(x) is adjusted "optically" with filter 36 as described above or "electrically" at the electrical input ELI as described above. The optical input OPI is illuminated by the sensed intensity of the optical analog signal AS and controls the state of the binary threshold signal T(x) which comprises an electrical component provided at the electrical output ELO and an optical component provided at the optical output OPO. The optical component of the binary threshold signal T(x) selectively switches on to radiate light in the first state when the sensed intensity of the optical analog signal AS exceeds the threshold intensity TI(x) and remains off in the second state when the sensed intensity of the analog signal AS does not exceed the threshold intensity TI(x) as indicated at position (a). On the other hand, the electrical components of the threshold signals T(x) are the inverse of the optical component as shown at position (b).

The linear array 81 of logic means 81(x) comprises a shift register 82 having x inputs separately connected to the correspondingly numbered electrical outputs ELO of the comparator DOES devices 80(x) and x outputs, a first linear array 83 of first DOES devices 83(x) having an optical input OPI connected to the correspondingly numbered optical output OPO of one of the comparator devices 80(x) and electrical input ELI connected to the correspondingly numbered output x of the shift register 82, and a second linear array 84 of second DOES devices 84(x) each having an electrical input ELI connected to the correspondingly numbered electrical output ELO of the second DOES devices 83(x). The first and second DOES devices 83(x) and 84(x) operate in the same fashion as the DOES device 80(x) described above. The shift register 82 can be, for example, a terminal board wired to electrically shift all of the electrical portions of the binary threshold signal T(x) to the next lower output position so that only one of the binary threshold signals T(x), the one at the index position, changes state from on to off as shown at position (c) and more specifically in FIG. 10 where the signal provided to the electrical input ELI of the first DOES device 83(4) switches from on to off. Thus, the shift register 82 provides a set of spacially shifted electrical threshold signals to the electrical inputs ELI of the first DOES devices 83(x). The electrical outputs ELO of the first DOES devices 83(x) provide the binary output signals described above, albeit electrical rather than optical in form.

As can be seen in FIG. 10, the example shows that the optical component of the threshold signals T(x) at all of the lower order positions below the index position (4) are on (L), while all of the electrical components of the threshold signals T(x) at the higher order output positions above the index position have been shifted on (1). As a result, the state of the first DOES device 83(4) at the index position (4) is the only one of the first DOES devices 83(x) that is OFF because both optical OPI and electrical ELI inputs are off. However, the first DOES devices 83(x) provide electrical binary output signals rather than the desired optical binary output signals from which the opitcal index signal I(x) is generated. The second linear array 84 of second DOES devices 84(x) is used to transform the electrical binary output signals to optical binary outputs signals provided by the optical outputs OPO of the second DOES devices 84(x). As a result, the electrical index signal provided by the appropriate first DOES device 83(x) at position (d) is transformed to the optical index signal I(x) at position (e). Thus, the first DOES device 83(4) at the index position 4 provides the electrical index signal (1) to the second DOES device 84(4) at the index position 4 which provides the optical index signal I(4). The index signal I(4) illuminates the mask 52(4) as shown in FIG. 1, to provide the optical digital signal DS(4) which represents the decimal number 3, the magnitude of the sensed intensity of the analog signal AS, as described above.

Having described the invention in detail and by referenced to preferred embodiments thereof, it will be apparent that other modifications and variations are possible without parting from the scope of the invention defined in the appended claims.

What is claimed is:

1. An analog to digital converter, adapted to convert an optical analog signal from a source of light having an intensity variable over a range from a minimum to a maximum value, to a proportionally equivalent optical digital signal, being one of x optically presented digital numbers defined by an n-bit digital word, where x equals $2^n$, comprising:

a linear array of comparator means, responsive to the source of light at a corresponding plurality of input positions, x, equally spaced along an input path, for sensing the intensity of the light and comparing the sensed intensity to a predetermined threshold intensity varying linearly from the minimum value at the first input position to the maximum value at the x'th input position to produce a binary threshold signal at each input position in response thereto, said binary threshold signal being in a first state when the sensed intensity exceeds said predetermined threshold intensity and a second state when said predetermined threshold intensity exceeds the sensed intensity, whereby the number of said comparator means producing binary threshold signals in the first state represents a one-dimensional spacial reference having a length corresponding to the magnitude of the sensed intensity;

light focusing means, disposed between said source of light and said linear array of comparator means, for focusing the source of light to provide a light beam collimated in at least one dimension to illuminate all of said comparator means, wherein the collimated width of said light beam is equal to the length of said linear array of comparator means;

a linear array of logic means, responsive to said binary threshold signals at a corresponding plurality of output positions, x, equally spaced along an output path and spacially aligned with said linear array of comparator means, for sensing the state of said binary threshold signals and producing a binary optical output at each output position in response thereto, one of said binary optical outputs, an optical index signal, being turned on at the output position corresponding to the input position at which said binary threshold signal switches to the second state from the first state, an index position, and the remaining ones of said binary optical outputs being turned off, whereby said index position is a one-point spacial reference having a location corresponding to the length of said one-dimensional spacial reference and the magnitude of the sensed intensity; and, a linear array of decoding means, responsive to said binary optical outputs at a corresponding plurality of readout positions, x, equally spaced along a readout path and spacially aligned with said linear array of logic means, and optically coded with a digital number at each readout position along a word path aligned generally perpendicular to said readout path, said digital numbers increasing serially for successive readout positions in proportion to increasing values of intensity from the minimum value to the maximum value, for projecting the digital number corresponding to the sensed intensity as said optical digital signal in response to being illuminated by said optical index signal;

whereby said index signal directly addresses and illuminates said decoding means that presents the digital number which corresponds to the magnitude of the sensed intensity represented by the location of said index position.

2. An analog to digital converter as recited in claim 1 wherein each of said decoding means comprises a mask of plastic film having n binary cells wherein each cell is optically coded to be transparent for one state and opaque for the other state to form one of said digital numbers defined by the n-bit digital word.

3. An analog to digital converter as recited in claim 2 further comprising means, disposed between said linear array of logic means and said linear array of decoding means, for diverging said optical index signal from any one of said output positions to illuminate all of said cells of the corresponding one of said masks, whereby each cell functions as one of n sources of light that present the optical digital signal as one of said digital numbers defined by the n-bit digital word.

4. An analog to digital converter as recited in claim 3 further comprising means, disposed to receive any one of said optical digital signals, for focusing said optical digital signal to a single location, whereby all of said optical digital words can be read by one n-bit sensor.

5. An analog to digital converter as recited in claim 2 wherein the binary cells are coded with a Gray code to form said digital numbers.

6. An analog to digital converter as recited in claim 1, wherein said linear array of comparator means comprises an optical comparator for each of said comparator means, all of said optical comparators being biased by a predetermined voltage, and filter means for spacially varying the magnitude of the sensed intensity at each input position so that each of said optical comparators is optically adjusted to the corresponding predetermined threshold intensity by a portion of said filter means.

7. An analog to digital converter as recited in claim 6, wherein said filter means is a piece of plastic film having transmissivities ranging from transparent at the first input position to substantially opaque at the x'th input position.

8. An analog to digital converter as recited in claim 1, wherein each comparator means of said linear array of comparator means comprises an optical comparator electrically adjusted to the corresponding predetermined threshold intensity by biasing separately each of said optical comparators with a different predetermined voltage.

9. An analog to digital converter as recited in claim 1, further comprising a first reference source of coherent light and wherein said comparator means comprises a SEED device having an optical data input for receiving coherent light from said reference source and an optical control input responsive to the sensed intensity, said SEED device being adjusted to said predetermined threshold intensity and having an optical data output providing said binary threshold signal by selectively blocking the received light in the first state and transmitting the received light in the second state in response to the comparison between the sensed intensity and said predetermined threshold intensity.

10. An analog to digital converter as recited in claim 9, wherein said linear array of logic means comprises means for splitting each of said binary threshold signals into duplicate optical paths, a modulation path and a reference path, means for spacially shifting all of said binary threshold signals in said modulation path by one output position to provide a set of spacially shifted threshold signals wherein only one of said binary threshold signals at said index position changes state from on to off, means for shifting the phase of all of said set of spacially shifted threshold signals by half of a wavelength to provide a set of fully shifted threshold signals, means for recombining said set of fully shifted threshold signals in the modulation path with said binary threshold signals in said reference path which destructively interfere with each other at all of the output positions except at said index position where said binary threshold signal switches on to provide said optical index signal.

11. The analog to digital converter as recited in claim 10, further comprising a second reference source of light and wherein said means for recombining comprises a first linear array of first SEED devices, each having an optical data input for receiving light from said second reference source, an optical control input responsive to said fully shifted threshold signals and said binary threshold signals at the corresponding output position and an optical data output for providing an inverted output, and a second linear array of second SEED devices, each having an optical data input for receiving light from said second reference source, an optical control input responsive to said inverted output at the corresponding output position and an optical data output, and wherein the optical control input of said first SEED device at said index position is responsive to a recombined index signal for providing an inverted index signal at the optical data output and wherein the optical control input of said second SEED device at said index position is responsive to said inverted index signal for providing said optical index signal at the optical data output.

12. An analog to digital converter as recited in claim 1, wherein each of said comparator means comprises a comparator DOES device forming a linear array of x comparator DOES devices, each comparator DOES device having an optical input responsive to the sensed intensity, an optical output and an electrical output, and being adjusted to said predetermined threshold intensity, said comparator DOES device providing said binary threshold signal comprising an optical component from the optical output selectively switching on to radiate light in the first state and switching off in the second state and an electrical component from the electrical output selectively switching on to provide a logic 1 signal in the second state and switching off in the first state in response to the comparison between the sensed intensity and said predetermined threshold intensity.

13. An analog to digital converter as recited in claim 12, wherein said linear array of logic means comprises register means, having x inputs connected separately to a correspondingly numbered electrical output of one of said comparator DOES devices for electrically shifting all of the electrical positions of said binary threshold signals by one output position to provide a set of spacially shifted electrical threshold signals at x outputs wherein only one of the electrical components of said binary threshold signals at said index position changes state from on to off, a first linear array of x first DOES devices each having an optical input connected to the correspondingly numbered optical output of one of said comparator DOES devices, an electrical input connected to the correspondingly numbered output of said register means and an electrical output providing an electrical binary output, and a second linear array of x second DOES devices each having an electrical input connected to the correspondingly numbered electrical output of one of said first DOES devices and an optical output providing the optical binary output wherein said second DOES device at said index position provides said optical index signal.

14. An analog to digital converter, adapted to measure the intensity of a source of light and optically project the measured intensity as an equivalent optical digital signal being one of x digital numbers defined by an n-bit digital word where $x=2^2$, comprising:
a plurality of comparator means responsive to the source of light at x input positions equally spaced along a first path on a first plane and adjusted to a predetermined threshold intensity increasing linearly for successive input positions, for comparing the intensity of the source of light at each input position to said predetermined threshold intensity to produce binary threshold signals which change state at an index position where the measured intensity exceeds the corresponding one of said predetermined threshold intensity, the relative position of said index position along said first path corresponding to the magnitude of the measured intensity;
a plurality of logic means, responsive to said binary threshold signals at x output positions equally spaced along a second path on a second plane, said second path being parallel to said first path, for producing an optical index signal in response to said change of state of said binary threshold signals at the output position corresponding spacially to said index position; and,
a plurality of decoding means, responsive to said plurality of logic means at x readout positions equally spaced along a third path on a third plane, said third path being parallel to said second path, and coded to represent serially increasing digital numerals for successive readout positions that correspond to increasing values of the measured intensity, for transforming the position of said optical index signal into n binary light sources along a word path perpendicular to said third path at the readout position corresponding spacially to said index position, wherein said binary light sources project the digital number corresponding to the measured intensity of the optical digital signal.

15. An analog to digital converter as recited in claim 14 wherein each of said decoding means comprises a mask of plastic film having a binary cells wherein each cell in optically coded to be transparent for one state and opaque for the other state to form one of the digital numbers defined by the n-bit digital word.

16. An analog to digital converter as recited in claim 15 further comprising means, disposed between said plurality of logic means and said plurality of decoding means, for diverging said optical index signal from any one of said output positions to illuminate all of said cells of the corresponding one of said masks.

17. An analog to digital converter as recited in claim 14, wherein said plurality of comparator means comprises an optical comparator for each of said comparator means, all of said optical comparators being biased by a predetermined voltage, and filter means for spacially varying the magnitude of the sensed intensity at each input position so that each of said optical comparators is optically adjusted to the corresponding predetermined threshold intensity by a portion of said filter means.

18. An analog to digital converter as recited in claim 17, wherein said filter means is a piece of plastic film having transmissivities ranging from transparent at the first input position to substantially opaque at the x'th input position.

19. An analog to digital converter as recited in claim 14, wherein each comparator means of said plurality of comparator means comprises an optical comparator electrically adjusted to the corresponding predetermined threshold intensity by biasing separately each of said optical comparators with a different predetermined voltage.

20. A method for converting an optical analog signal, a source of light having an intensity variable over a range from a minimum to a maximum value, to an equivalent optical digital signal being one of x optically presented n-bit digital words, where $x=2^n$, the method comprising the steps of:
sensing the intensity of the source of the light at a plurality of input positions, x, equally spaced along an input path;
comparing the sensed intensity to a predetermined threshold intensity varying linearly from the minimum value at the first input position to the maximum value at the x'th input position;
producing a binary threshold signal at each input position in response to the comparison, the binary threshold signal being in a first state when the sensed intensity exceeds the predetermined threshold intensity and in a second state when the predetermined threshold intensity exceeds the sensed intensity, the number of binary threshold signals in the first state representing a one-dimensional spacial reference having a length corresponding to the magnitude of the sensed intensity;
sensing the state of the binary threshold signals at a corresponding plurality of output positions, x, equally spaced along an output path and spacially aligned with the input positions on the input path;
producing an optical binary output at each output position in response to sensing the state, one of the optical binary outputs, an optical index signal, being turned on at the output position corresponding to the input position at which the binary threshold signals switch to the second state from the first state, an index position and the remaining ones of the optical binary outputs being turned off, the index position being a one-point spacial reference having a location corresponding to the length of the one-dimensional spacial reference and the magnitude of the intensity;

sensing the optical binary outputs at a corresponding plurality of readout positions, x, equally spaced along a readout path and spacially aligned with the output positions, wherein each readout position is optically coded along a word path aligned generally perpendicular to the readout path with a digital word; and, projecting the digital word corresponding to the sensed intensity as the optical digital signal in response to being illuminated by the optical index signal, wherein the index signal directly addresses and illuminates the readout position that presents a digital word that corresponds to the magnitude of the sensed intensity.

21. A method as recited in claim 20, wherein each readout position in the step for sensing the optical binary outputs is coded with binary cells wherein each cell is transparent for one state or opaque for the other state to form one of the digital numerals of the n-bit digital word.

22. A method as recited in claim 21, further comprising the step of diverging the optical index signal from any one of the output positions to illuminate all of the cells at a corresponding readout position.

23. A method as recited in claim 20, wherein the predetermined threshold intensity in the comparing step is adjusted optically by spacially varying the magnitude of the sensed intensity at each input position.

24. A method as recited in claim 20, wherein the predetermined threshold intensity in the comparing step is adjusted electrically by biasing separately the magnitude of the predetermined threshold signal at each input position.

* * * * *

UNITED STATES PATENT AND TRADEMARK OFFICE
CERTIFICATE OF CORRECTION

PATENT NO. : 4,851,840
DATED : July 25, 1989
INVENTOR(S) : McAulay

It is certified that error appears in the above-identified patent and that said Letters Patent is hereby corrected as shown below:

On the title page:

Abstract, line 12, "respresent" should be --represent--
Col. 4, line 12, "oflight" should be --of light--
Col. 4, line 67 &68, "switch-off" should be --switch off--

Col. 5, line 33, "reponsive" should be --responsive--
Col. 9, line 4, "(ELI=o" should be --(ELI=O--
Col. 10, line 5, "opitcal" should be --optical--
Col. 13, Claim 14, line 35, "$x=2^2$" should be --$x=2^n$--

Signed and Sealed this

Twenty-fourth Day of April, 1990

Attest:

HARRY F. MANBECK, JR.

*Attesting Officer*       *Commissioner of Patents and Trademarks*